(12) United States Patent
Oukassi et al.

(10) Patent No.: US 8,722,234 B2
(45) Date of Patent: May 13, 2014

(54) MICROBATTERY AND METHOD FOR MANUFACTURING SAME

(75) Inventors: Sami Oukassi, Saint-Egreve (FR); Philippe Coronel, Barraux (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 82 days.

(21) Appl. No.: 13/581,401

(22) PCT Filed: Feb. 23, 2011

(86) PCT No.: PCT/FR2011/000107
§ 371 (c)(1), (2), (4) Date: Aug. 27, 2012

(87) PCT Pub. No.: WO2011/107675
PCT Pub. Date: Sep. 9, 2011

(65) Prior Publication Data
US 2012/0321938 A1    Dec. 20, 2012

(30) Foreign Application Priority Data

Mar. 1, 2010  (FR) ..................... 10 00822

(51) Int. Cl.
| | |
|---|---|
| *H01M 6/12* | (2006.01) |
| *H01M 6/46* | (2006.01) |
| *H01M 2/00* | (2006.01) |
| *H01M 4/82* | (2006.01) |
| *H01M 6/00* | (2006.01) |

(52) U.S. Cl.
USPC ......... 429/162; 429/163; 29/623.1; 29/623.2; 29/623.3; 29/623.4; 29/623.5

(58) Field of Classification Search
CPC ....... H01M 2/0202; H01M 6/12; H01M 6/46; H01M 2/00; H01M 4/82; H01M 6/00

USPC ............. 429/163, 162, 50, 7; 29/623.1–623.5
See application file for complete search history.

(56) References Cited

U.S. PATENT DOCUMENTS

2007/0087230 A1    4/2007    Jenson et al.
(Continued)

FOREIGN PATENT DOCUMENTS

| DE | 10 2008 011 523 A1 | 8/2009 |
|---|---|---|
| FR | 2 874 128 A1 | 2/2006 |

(Continued)

OTHER PUBLICATIONS

International Search Report issued in International Application No. PCT/FR2011/000107 dated May 3, 2011 (with translation).

*Primary Examiner* — Patrick Ryan
*Assistant Examiner* — Kiran Quraishi
(74) *Attorney, Agent, or Firm* — Oliff PLC (57) ABSTRACT

The invention relates to a microbattery that comprises a stack on a substrate, covered by an encapsulation layer and comprising first and second current collector/electrode assemblies, a solid electrolyte and electrical connections of the second current collector/electrode assembly to an external electrical load. The electrical connections are formed by at least two electrically conductive barriers passing through the encapsulation layer from an inner surface to an outer surface of the encapsulation layer. Each of the barriers has a lower wall in direct contact with a front surface of the second current collector/electrode assembly and an upper wall opening onto the outer surface of the encapsulation layer. The barriers form a compartmentalization network within the encapsulation layer.

10 Claims, 6 Drawing Sheets

(56) References Cited

U.S. PATENT DOCUMENTS

2007/0238019 A1* 10/2007 Laurent et al. ............... 429/163
2009/0214899 A1* 8/2009 Shakespeare et al. ........... 429/7
2011/0052979 A1* 3/2011 Bouillon et al. ............. 429/185
2011/0070480 A1* 3/2011 Hahn et al. .................. 429/162

FOREIGN PATENT DOCUMENTS

| JP | A-61-165965 | 7/1986 | |
| WO | WO 00/60689 | 10/2000 | |
| WO | WO 2008/011061 A1 | 1/2008 | |
| WO | WO 2009106365 A1 * | 9/2009 | ............ H01M 10/04 |

* cited by examiner

MICROBATTERY AND METHOD FOR MANUFACTURING SAME

BACKGROUND OF THE INVENTION

The invention relates to a microbattery comprising a stack of solid thin layers formed on a substrate, said stack being covered by an encapsulation layer and successively comprising:
- a first current collector/electrode assembly in direct contact with the substrate,
- a solid electrolyte,
- a second current collector/electrode assembly having a front surface in direct contact with the inner surface of the encapsulation layer and a rear surface in direct contact with the solid electrolyte and,
- electrical connections of the second current collector/electrode assembly to an external electrical load.

The invention also relates to a manufacturing method of such a microbattery.

STATE OF THE ART

A microbattery is defined as being an all-solid electrochemical generator formed by an active stack of thin layers that constitute the (positive and negative) electrodes separated by an electrolyte. Such a microbattery further comprises metal current collectors. All the layers of the microbattery are in the form of thin films obtained by PVD (Physical Vapor Deposition) or CVD (Chemical Vapor Deposition).

The positive electrode is generally a lithium insertion material, for example lithiated metal oxides, and the electrolyte is an electronic insulator with a high ionic conductivity.

For lithium microbatteries, three main categories of microbattery implementing $Li^+$ ions can be distinguished depending on the nature of the negative electrode: microbatteries called "lithium-metal", "lithium-ion" or "lithium-free" microbatteries.

Microbatteries called "lithium-metal" microbatteries present the best electrochemical properties, in particular in terms of potential and stability of the charging and discharging capacity. This first category of lithium micro-battery comprises a negative electrode made from metallic lithium.

Microbatteries called "lithium-ion" (or Li-ion) microbatteries have a negative electrode formed by a lithium intercalation or insertion material. The $Li^+$ cations go back and forth between the negative and positive electrodes on each charging and discharging of the microbattery. This category of micro-battery enables the usual microfabrication techniques to be used, but generally presents less good electrochemical performances on cycling.

Finally, microbatteries called "lithium-free" microbatteries comprise a metallic current collector as negative electrode. During a first charge, the $Li^+$ ions migrate from the positive electrode and are blocked by the current collector. The $Li^+$ ions form a layer of metallic lithium on the current collector by electro-deposition. The battery then behaves in the same manner as a lithium-metal battery, with a small capacity drop during the first cycle.

Lithium microbatteries are particularly interesting due to their high mass density, their high useful energy storage surface and their low toxicity. They are however sensitive to air and in particular to moisture. In order to protect the active stack of the lithium microbattery, a packaging is generally made in order to isolate the stack from outside contact thereby preventing any contamination from the environment.

Different microbattery architectures exist, in particular architectures that present a planar or vertical electrical connection, i.e. in which the final electrical connection of the microbattery to an external load is made either on the same plane as that of the current collector or on a plane that is vertical with respect to the latter.

Figure 1:
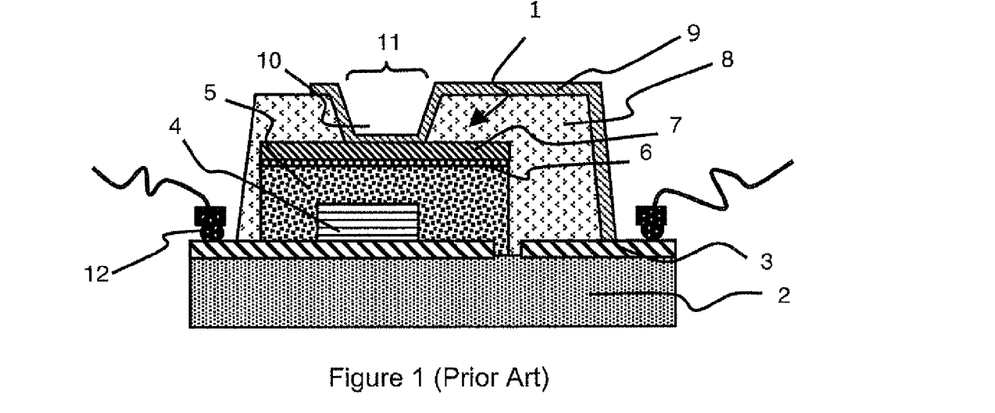
FIG. 1 schematically represents a microbattery with a planar electrical connection according to the prior art, in cross-section.

For example purposes, the document WO2008/011061 describes a micro-battery with a planar electrical connection. As represented in FIG. 1, the microbattery typically comprises a stack 1 on a substrate 2. Stack 1 is successively formed by a first current collector 3, a first electrode 4 covered by a solid electrolyte 5, a second electrode 6 and a second current collector 7. Stack 1 is encapsulated by a coating 8 that is inert to the elements forming stack 1 and designed to tightly seal the latter and to protect it against external contamination. A contact connection is made through a metal layer 9 on coating 8 and coupled to the second current collector 7 via a through hole 10 made in coating 8. The contact connection connects second current collector 7 situated above stack 1 and first current collector 3. Through hole 10 passes through coating 8 and defines a localized area 11 of stack 1 covered only by metal layer 9 forming the contact connection. Localized area 11 then constitutes a fragile point of the microbattery that is more sensitive to mechanical stresses. In particular, operation of the lithium microbattery being based on transport of current by the lithium ions, when charging and discharging of the microbattery take place, the electrodes undergo deformations due to insertion and extraction, also called de-insertion, of the lithium ions in the electrodes. These repeated modifications of volume rapidly give rise to mechanical damage. The parts of layer 9 comprised between localized areas 11 and the fixed connecting point with layer 3 are more sensitive to mechanical stresses which can consequently give rise to failures in use and be the cause of a decrease in the performances of the micro-battery.

As represented in FIG. 1, electrical connection of this type of architecture with an external electrical load (not shown) is performed conventionally by contact pads 12 arranged on each side of coating 8, in the extension of current collector 3. Contact pads 12 form contact terminals which enable the microbattery to be connected for example to the external electrical load, to one or more additional microbatteries, to an electronic chip or to any electrical load. Final connection to the external load is typically made by a soldering step with a wire. In addition to a complex and delicate implementation, this type of architecture presents a drawback in terms of integration. A part of the surface of first current collector 3 is in fact occupied by contact pads 12, which consequently limit the surface dedicated to first electrode 4. The electrochemical properties of the microbattery, and for example the capacity (in $\mu Ah \cdot cm^{-2}$), are however proportional to the active surface of the microbattery, in particular to the dimensions of the first electrode 4/electrolyte 5 and first electrode 4/first current collector 3 interfaces. A loss of active surface is then observed that is synonymous with a loss both of electrochemical performance and of integration density (number of devices per surface unit on the substrate).

Figure 2:
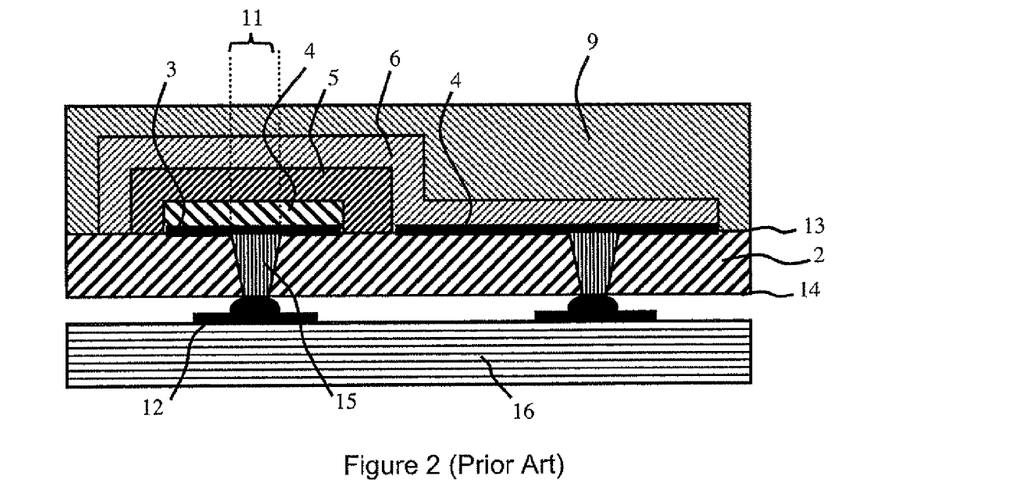
FIG. 2 schematically represents a microbattery with a vertical electrical connection according to the prior art, in cross-section.

For example purposes, the document US-A-20070238019 describes a microbattery with a vertical electrical connection with respect to the main plane of substrate 2. In this configuration represented in FIG. 2, a stack deposited on a substrate 2 conventionally comprises a cathode 4 and an anode 6 separated by an electrolyte 5. Substrate 2 has a front surface 13 and a rear surface 14. First and second current collectors, respectively 3 and 4, are arranged on front surface 13 of substrate 2. Substrate 2 presents pass-through connections 15 from current collectors, 3 and 4, on the front surface 13 up to an external load 16 to be connected at the level of rear surface 14 of substrate 2. This configuration enables the active surface of the microbattery to be increased and also both enhances the electrochemical properties and increases the integration density. This architecture does however present a complex implementation in so far as several microfabrication steps (deposition, etching, chemical mechanical polishing) are necessary to perform the vertical electrical connections.

Other microbattery architectures with a vertical connection have been proposed. The documents JP-A-61165965, US-A-2007087230 and DE-A-102008011523 can be cited for example.

The solutions described in the prior art do however remain insufficient to overcome the problems of mechanical stresses generated by contact connection or they remain difficult to implement. In particular, the presence of a localized area induces a fragile point within the microbattery that is more particularly subject to volume deformations of the microbattery, which is liable to crack, fissure or delaminate.

OBJECT OF THE INVENTION

The object of the invention is to provide a microbattery and the manufacturing method of such a microbattery method remedying the drawbacks of the prior art.

In particular, the object of the invention is to provide a microbattery with good performances that presents an optimized energy storage efficiency, a high integration density and an improved lifetime. The microbattery is designed to be fabricated according to an industrial manufacturing method that is easy to implement, is economically viable and is compatible with technologies implemented in the microelectronics field.

According to the invention, this object is achieved by a microbattery and a method for manufacturing such a microbattery according to the appended claims.

In particular, this object is achieved by the fact that the electrical connections are formed by at least two electrically conductive barriers passing through the encapsulation layer from the inner surface to the outer surface of said encapsulation layer, each of said barriers having a lower wall in direct contact with the front surface of the second current collector/electrode assembly and an upper wall opening onto the outer surface of the encapsulation layer, and by the fact that said barriers form a compartmentalization network within the encapsulation layer.

According to a particular development, at least two barriers are adjacent and parallel to one another and are separated by a part of the encapsulation layer.

According to a preferred embodiment, at least two barriers are adjacent and parallel to one another and are separated by a part of the encapsulation layer, and the distance separating the two adjacent and parallel barriers is smaller than or equal to the inverse of the square root of the dislocation density of said encapsulation layer.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 3:
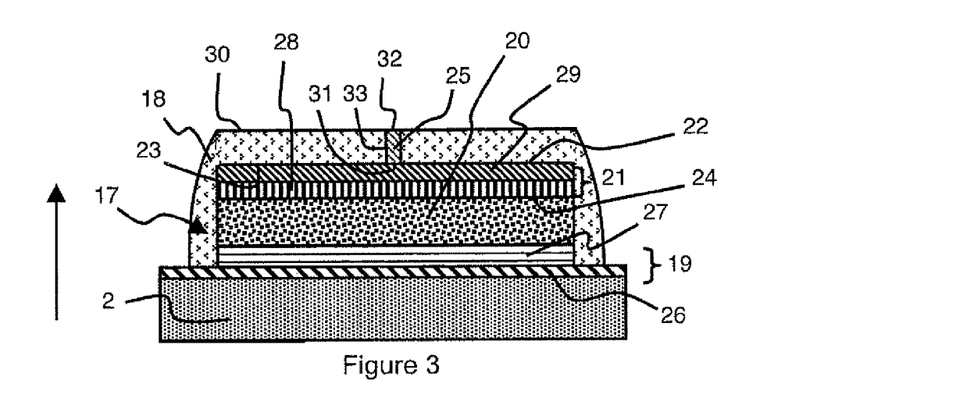
FIG. 3 schematically represents a microbattery according to a first particular embodiment of the invention, in cross-section.

With reference to FIG. 3, a microbattery, also called "all-solid" battery, comprises a stack 17 of solid thin layers formed on a substrate 2. Substrate 2 can be a silicon wafer or a silicon wafer containing an Application Specific Integrated Circuit, or ASIC. Substrate 2 can also be covered by a passivation layer (not shown) formed by a dielectric such as silicon dioxide ($SiO_2$) or by a bilayer successively formed by a layer of $SiO_2$ and a layer of silicon nitride ($Si_3N_4$). The microbattery is preferably a lithium microbattery.

Stack 17 has a thickness advantageously comprised between 2 μm and 20 μm, preferably 15 μm.

Stack 17 is covered by an encapsulation layer 18 and successively comprises:
- a first current collector/electrode assembly 19 in direct contact with substrate 2,
- a solid electrolyte 20,
- a second current collector/electrode assembly 21 having a front surface 22 (at the top in FIG. 3) in direct contact with inner surface 23 of encapsulation layer 18 and a rear surface 24 (at the bottom in FIG. 3) in direct contact with solid electrolyte 20 and,
- electrical connections 25 of second current collector/electrode assembly 21 to an external electrical load.

The first and second current collector/electrode assembly, respectively 19 and 21, are each formed by at least one thin layer.

According to a first particular embodiment represented in FIG. 3, first current collector/electrode assembly 19 can be formed by a first current collector 26 and a positive electrode 27. First current collector 26 is then in direct contact with substrate 2 and positive electrode 27 is located between first current collector 26 and solid electrolyte 20.

Second current collector/electrode assembly 21 can comprise a thin layer forming a negative electrode 28 and a thin layer forming a second current collector 29. Second assembly 21 is preferably formed by the negative electrode 28 and the second current collector 29. As represented in FIG. 3, second current collector 29 is formed on negative electrode 28 and solid electrolyte 20 is arranged between positive electrode 27 and negative electrode 28. In this case, front surface 22 and rear surface 24 of second current collector/electrode assembly 21 are respectively formed by the front surface of second current collector 29 and the rear surface of negative electrode 28.

First and second current collectors, respectively 26 and 29, are made from metal, for example from platinum (Pt), chromium, (Cr), gold (Au), titanium (Ti), tungsten (W) or molybdenum (Mo).

Positive electrode 27 has a smaller dimension than that of first current collector 26 so that positive electrode 27 does not extend beyond the perimeter of first current collector 26 and is not in contact with substrate 2 or with passivation layer of substrate 2. The materials used as active materials of positive electrode 27 can be either non-lithiated materials such as for example copper sulfides or disulfides (CuS or $CuS_2$), tungsten oxysulfides ($WO_yS_z$), titanium disulfides ($TiS_2$), titanium oxysulfides ($TiO_xS_y$) or vanadium oxides ($V_xO_y$) or lithiated materials such as for example lithium-based mixed oxides such as lithium and cobalt oxide ($LiCoO_2$), lithium and nickel oxide ($LiNiO_2$), lithium and manganese oxide ($LiMn_2O_4$), lithium and vanadium pentoxide ($LiV_2O_5$) or lithium and iron phosphate ($LiFePO_4$).

Negative electrode 28 can conventionally be formed by one or more materials chosen from transition metals and their alloys, metalloids and their alloys, and lithium insertion or intercalation materials. Negative electrode 28 can be a $Li^+$ ion generator or also comprise an active lithium insertion material. The materials used as active material of negative electrode 28 can be non-lithiated materials such as for example silicon (Si) and its alloys such as silicon/germanium alloy (SiGe), tin and its alloys such as tin/copper alloy ($Cu_6Sn_5$), carbon or a lithium insertion or intercalation material chosen from tin and silicon oxynitrides (SiTON), tin nitrides ($SnN_x$), indium nitrides ($InN_x$), and tin oxides such as tin dioxide ($SnO_2$). The materials used as active materials of negative electrode 28 can be lithiated materials, for example a $SiLi_x$ or $GeLi_x$ alloy containing less than 30% of lithium or a lithium-based mixed oxide such as lithium and nickel oxide ($LiNiO_2$).

The positive and negative electrodes, respectively 27 and 28, can naturally have reversed positions in stack 17. Positive electrode 27 can for example be at the top in FIG. 3 and negative electrode 28 be at the bottom.

Solid electrolyte 20 is formed by a material enabling conduction of $Li^+$ lithium ions. Electrically insulating and ionic conductive materials will preferably be chosen. Solid electrolyte 20 can be a vitreous material having a base formed by boron oxide, lithium oxides or lithium salts, or advantageously a lithium-based compound such as phosphorus and lithium oxynitride (UPON) or a lithium phosphosilicate oxynitride (LiSiPON).

Encapsulation layer 18 is conventionally formed by one or more materials chosen from polymer, ceramic or metallic materials.

Electrical connections 25 are formed by at least one electrically conductive barrier passing through encapsulation layer 18 from inner surface 23 (at the bottom in FIG. 3) to outer surface 30 (at the top in FIG. 3) of encapsulation layer 18. In other words, the barrier opens onto outer surface 30 of encapsulation layer 18. What is meant by barrier is a thin element of small thickness, determining separations in encapsulation layer 18. The barrier has a lower wall 31, an upper wall 32 and side walls 33 and preferably has a rectangular cross-section. The thickness of the barrier is advantageously comprised between 0.5 µm and 10 µm, preferably between 1 µm and 5 µm. The height of the barrier or of side walls 33 of the barrier is at least equal to the thickness of encapsulation layer 18. Lower wall 31 is in direct contact with front surface 22 of second current collector/electrode assembly 21 and upper wall 32 opening onto outer surface 30 of encapsulation layer 18.

The barrier is preferably formed by at least one electrically conductive material, advantageously chosen from metals and their alloys, polymers and metal oxides. The barrier is advantageously formed solely by conductive materials, for example titanium, tungsten, platinum, nickel or copper. The barrier is preferably solid, i.e. completely filled with materials.

As represented in FIG. 3, upper wall 32 of the barrier preferably forms a common flat surface with outer surface 30 of encapsulation layer 18. The barrier is thus not salient from the surface of encapsulation layer 18.

Side walls 33 of each barrier (on the right and left in FIG. 3) are further perpendicular to front surface 22 of second current collector/electrode assembly 21. The volume expansion due to insertion and extraction of lithium then has little effect on such an architecture as the mechanical stresses are mainly generated in the same direction, represented by the vertical arrow in FIG. 3, orthogonal with respect to the main plane of substrate 2.

For an encapsulation layer 18 having a uniform thickness above second current collector/electrode assembly 21, the height of the barrier is equal in substance to the thickness of encapsulation layer 18 situated above second assembly 21. What is meant by the height of the barrier is the height of side walls 33 of the barrier.

For an encapsulation layer 18 having a non-uniform thickness of layer above second current collector/electrode assembly 21, the height of the barrier is in substance equal to the thickness of the part of encapsulation layer 18 situated on each side of the barrier.

The presence of the barrier within encapsulation layer 18 enables a discontinuity of the defects present in encapsulation layer 18 to be created thereby reducing the critical diffusion paths of the species liable to impair the active elements of microbattery stack 17. The barrier blocks the impurities and creates a crack propagation stopper area within encapsulation layer 18.

The barrier further having a small thickness, the contact section between lower wall 31 and inner surface 23 of encapsulation layer 18 is greatly reduced. The fragile area of the microbattery, that is devoid of encapsulation and protected only by the barrier, is thereby greatly reduced.

According to a particular embodiment, fabrication of such a microbattery can be performed according to a manufacturing method that comprises the successive steps represented in FIGS. 4 to 11 and described in the following.

Figure 4:
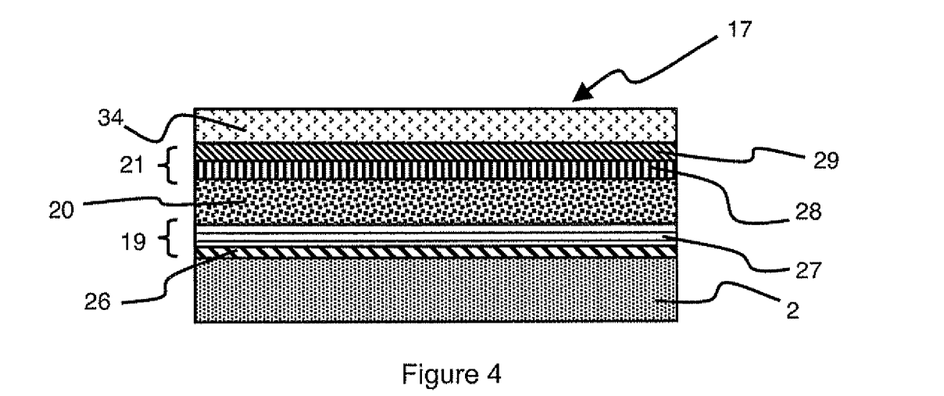
FIGS. 4 to 10 schematically represent different steps of a method for manufacturing a microbattery according to FIG. 3, in cross-section.

As represented in FIG. 4, the manufacturing method comprises full-wafer deposition, on substrate 2, of a stack 17 of thin layers successively forming a first current collector 26, a positive electrode 27, a solid electrolyte 20, a negative electrode 28 and a second current collector 29. First current collector 26 and positive electrode 27 form first current collector/electrode assembly 19 and second current collector 29 and negative electrode 28 form second current collector/electrode assembly 21.

This step is followed by full-wafer deposition of a first protective layer 34 on second current collector/electrode assembly 21. In this configuration, first protective layer 34 is deposited directly on second current collector 29.

Full-wafer deposition is performed by any method, for example by PVD or CVD. The thickness of the thin layers is typically comprised between 0.1 µm and 5 µm.

First protective layer 34 is formed by one or more materials chosen from polymer or ceramic materials that are advantageously non-conductive, for example made from epoxide, acrylate, parylene, silica or nitride.

When a thermal annealing step is required to increase the crystallization of the thin layer constituting one of the electrodes and to increase its insertion capacity, this annealing step can be advantageously formed after full-wafer deposition of the first thin layer thus forming electrode 27.

Figure 5:
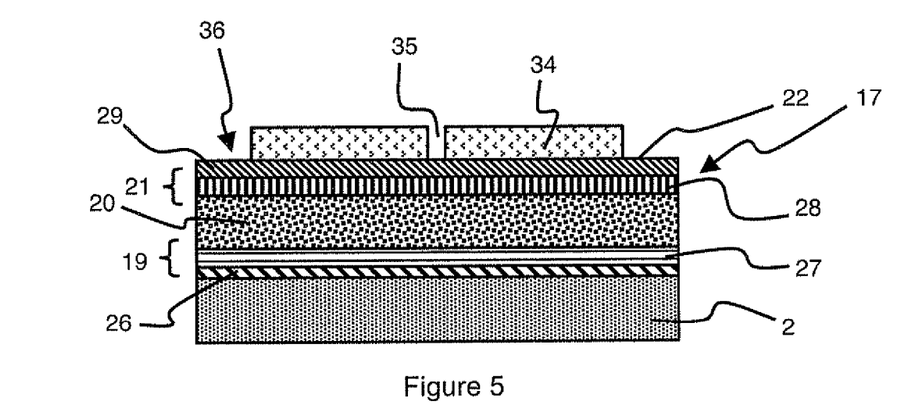

As represented in FIG. 5, at least one trench 35 is then made in first protective layer 34 by any method.

Trench 35 is conventionally made by conventional photolithography masking processes followed by etching, for example, by selective dry etching of Reactive Ion Etching (RIE) type or by selective wet process etching.

Trench 35 forms a matrix to make a barrier. The barrier is designed to introduce a discontinuity in first protective layer 34. What is meant by matrix is a hollow imprint of the barrier. Trench 35 passes through the thickness of first protective layer 34 and opens onto front surface 22 of second current collector/electrode assembly 21, i.e. the front surface of second current collector 29.

One or more peripheral trenches 36 are also advantageously made simultaneously with trench 35 in order to define the final shape and dimensions of the microbattery. Peripheral trenches 36 also pass through the thickness of first protective layer 34 and open onto front surface 22 of second current collector/electrode assembly 21, i.e. the front surface of second current collector 29.

Figure 6:
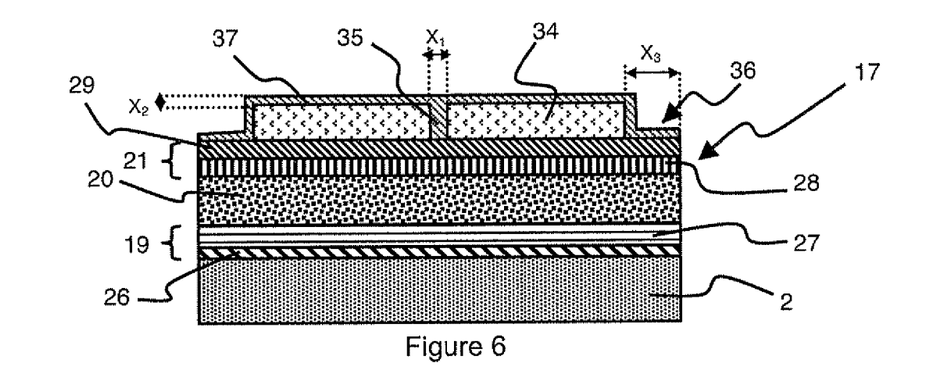
Figure 7:
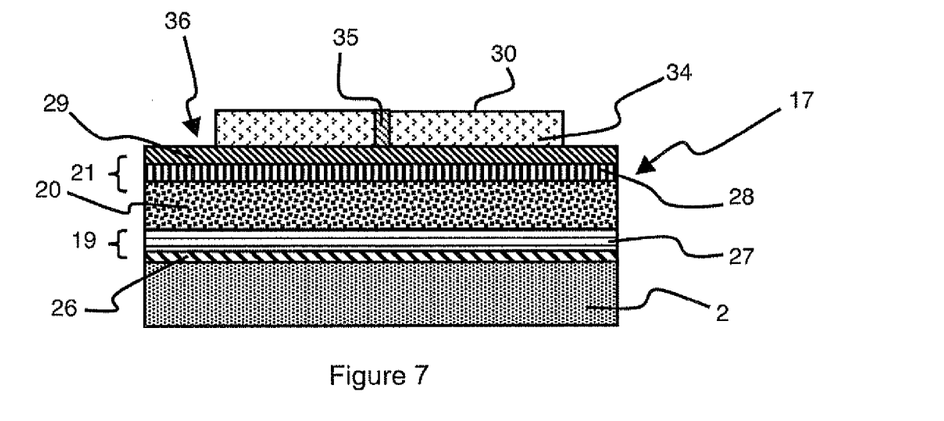

As represented in FIGS. 6 and 7, trench 35 is then filled with an electrically conductive material. This filling step comprises deposition of a thin layer 37 of electrically conductive material on first protective layer 34 by any known method, followed by a selective etching of thin layer 37. For example purposes, the selective etching can be a dry process etching.

As represented in FIG. 6, the thickness of trench 35, noted $X_1$, is preferably smaller than or equal to twice the thickness of thin layer 37, noted $X_2$, so that trench 35 is completely filled by the electrically conductive material forming thin layer 37.

The thickness of peripheral trench or trenches 36, noted $X_3$, is preferably larger than or equal to twice the thickness $X_2$ of thin layer 37. Peripheral trenches 36 delineating the microbattery are thus not completely filled.

As represented in FIG. 7, thin layer 37 is etched by any known method, for example by dry process etching. On account of the particular dimensioning of trenches 35 and 36, thin layer 37 located in peripheral trenches 36 and on outer surface 30 of first protective layer 34 (at the top in FIG. 7) is eliminated as the parts of thin layer 37 are directly exposed to the etching solution whereas the part of thin layer 37 in trench 35, which is narrower, is not. On completion of this etching step, only the part of thin layer 37 in trench 35 remains.

This step enables a barrier to be obtained within first protective layer 34 and furthermore does not require a masking operation prior to etching.

Figure 8:
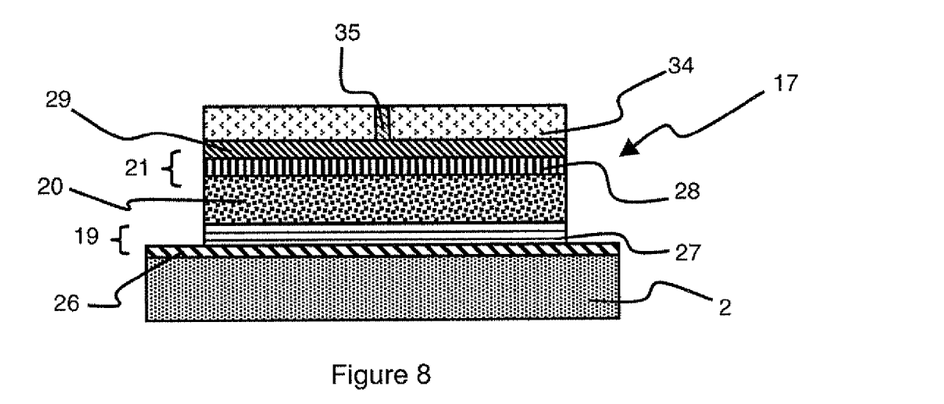

As represented in FIG. 8, after trench 35 has been filled, one or more etching steps of stack 17 are performed, by any known method, to localize the microbattery on substrate 2. The type of etching used depends on the nature of the thin layers to be etched. It can thus be envisaged to perform masking by photolithography followed by a single etching operation to simultaneously etch second current collector 29, negative electrode 28, solid electrolyte 20 and positive electrode 27. A part of the surface of first protective layer 34 is then exposed (on the right and on the left in FIG. 8). This etching step gives the final shape of active stack 17 of the microbattery. The exposed part of first protective layer 34 can be located around stack 17.

According to an alternative embodiment, etching of stack 17 is performed by a succession of selective etchings for one or more thin layers corresponding to second current collector 29, to negative electrode 28, to solid electrolyte 20 or to positive electrode 27.

Figure 9:
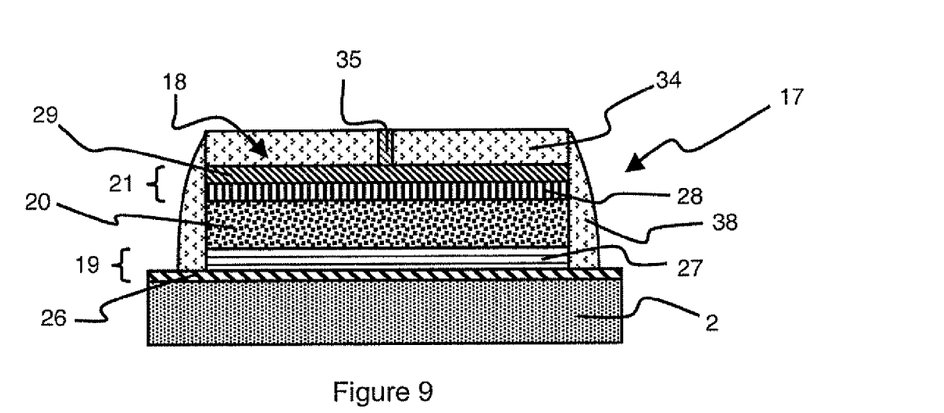

As represented in FIG. 9, a second protective layer 38 is made by any known method, for example by deposition followed by etching. Second protective layer 38 forms a continuous uninterrupted layer with second protective layer 38. Second protective layer 38 is conventionally formed by one or more materials chosen from polymer, ceramic or metallic materials. First and second protective layers, respectively 34 and 38, are advantageously formed by the same material or materials. Second protective layer 38 covers all the lateral parts of stack 17 (on the right and on the left in FIG. 9) and extends on each side of stack 17 on first current collector 26, without however covering all of the exposed part of first current collector 26. First and second protective layers, respectively 34 and 38, thus form encapsulation layer 18.

Figure 10:
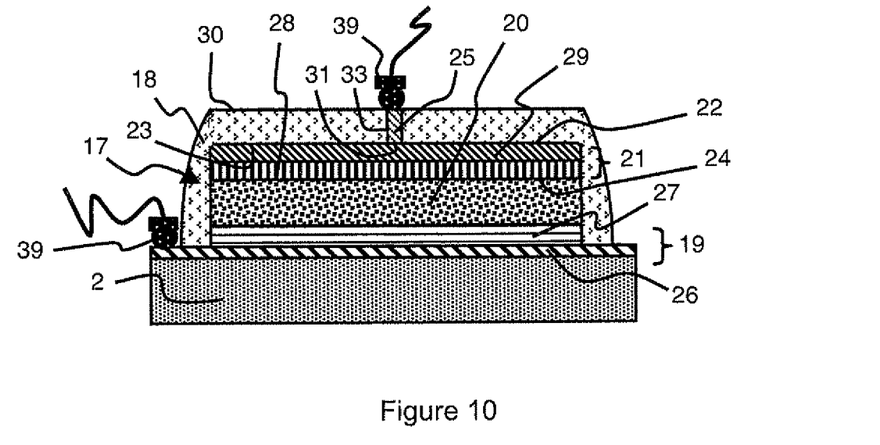

The exposed surface of first current collector 26, situated at the periphery of the microbattery, constitutes the contact points for connection to an external electrical load. Thus, as illustrated in FIG. 10, contact pads 39 enable an external electrical load (not shown) to be connected to first and second current collectors, respectively 26 and 29, and consequently to positive electrode 27 and negative electrode 28 of the microbattery. Contact pads 39 can be arranged on each side of stack 17, on the exposed surface of first current collector 26. Contact wires are conventionally soldered onto contact pads 39 and connected to external electrical load (FIG. 10).

Figure 11:
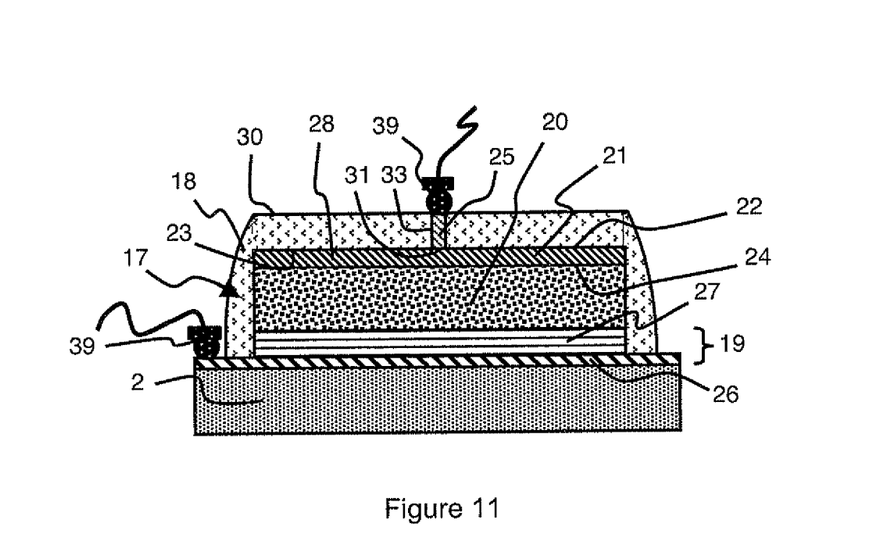
FIG. 11 schematically represents a microbattery according to a second particular embodiment of the invention, in cross-section.

According to a second particular embodiment represented in FIG. 11, the microbattery is a "Li free" microbattery. Before the first charging of the micro-battery, second current collector/electrode assembly 21 is initially formed by a single thin layer. The latter is formed by a metal or a metal alloy. This thin layer constitutes a plating layer for electrolytic deposition of metallic lithium. The lithium deposition is then activated when charging of the micro-battery is performed. As described in the document WO-A1-0060689, before its initial charging, the microbattery does not comprise a thin layer of metallic lithium constituting negative electrode 28. The latter is formed by the electrolytic deposition of metallic lithium when charging of the microbattery takes place. After the first charging of the microbattery, second current collector/electrode assembly 21 is formed by a thin layer constituting second current collector 29 and a thin layer of metallic lithium constituting negative electrode 28 (FIG. 10).

The method for manufacturing the microbattery according to the second particular embodiment is identical to the first embodiment described in the foregoing, with the exception that negative electrode 28 and second current collector 29 are achieved by deposition of a single thin layer.

Figure 12:
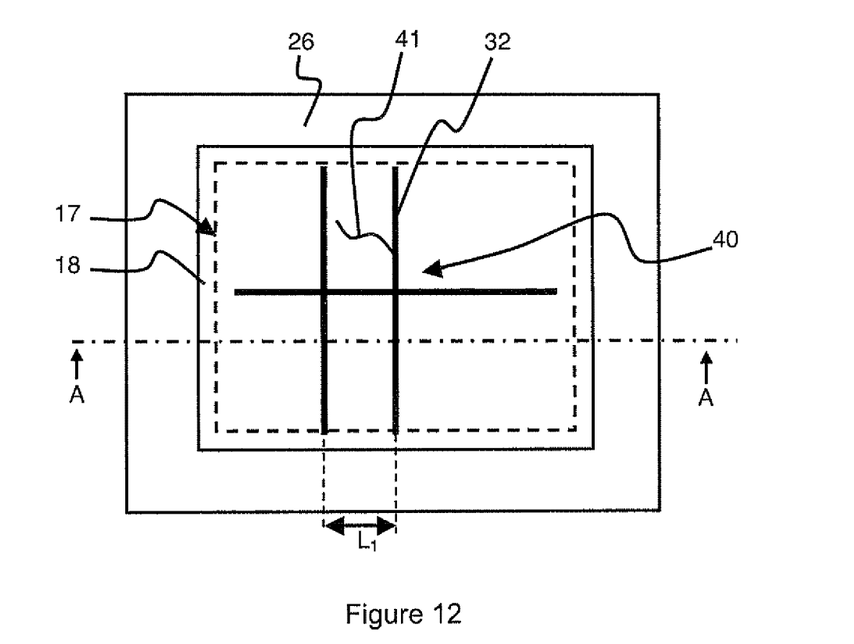
FIG. 12 schematically represents a microbattery according to a third particular embodiment of the invention, in top view.
Figure 13:
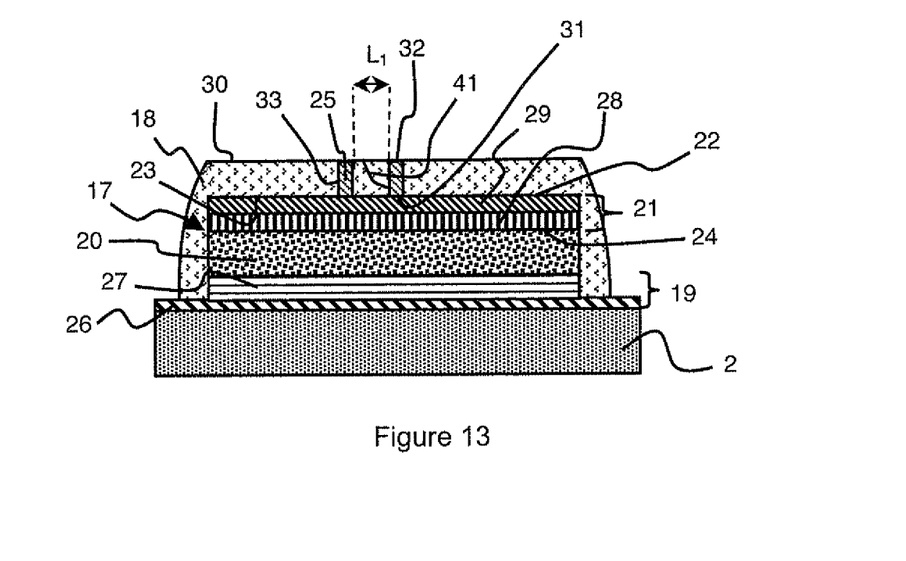
FIG. 13 schematically represents a microbattery according to the third particular embodiment of the invention, in cross-section along the line AA of FIG. 12.

According to a third particular embodiment represented in FIGS. 12 and 13, electrical connections 25 are formed by at least two electrically conductive barriers. The barriers form a compartmentalization network 40 within encapsulation layer 18.

What is meant by "compartmentalization network" is an assembly formed by at least two compartmenting barriers that cross one another, advantageously in regular manner, said barriers dividing encapsulation layer 18 into several compartments. The compartmentalization network thereby creates one or more crack propagation area(s) 41 that are liable to form within encapsulation layer 18, during operation of the microbattery.

Each of the barriers has a lower wall 31 in direct contact with front surface 22 of second current collector/electrode assembly 21 and an upper wall 32 opening onto outer surface 30 of encapsulation layer 18.

According to an advantageous configuration, at least two barriers are adjacent and parallel to one another. The two barriers are thus separated from one another by a part of the encapsulation layer 18. Side walls 33 of the barriers are perpendicular to front surface 22 of second current collector/electrode assembly 21 and parallel to one another (FIG. 13).

The distance separating the two adjacent and parallel barriers, noted $L_1$, is preferably smaller than or equal to the inverse of the square root of the dislocation density of encapsulation layer 18, noted $d_d$. What is meant by dislocation density of encapsulation layer 18 is the density of defects per surface unit. Thus, to reduce or eliminate the defect discontinuity, the configuration of the microbattery, in particular the arrangement of the barriers with respect to one another, has to comply with the following relation:

$$L_1 \leq \frac{1}{\sqrt{d_d}}$$

For example, for a dislocation density of 4 disloc/$\mu m^2$, distance $L_1$ separating the two adjacent and parallel barriers has to be smaller than or equal to 0.5 $\mu m^2$.

Compartmentalization network 40 creates a discontinuity of the defects present in encapsulation layer 18, thereby reducing the critical diffusion paths of the species liable to impair the active elements of stack 17 of the microbattery. Likewise, each barrier of compartmentalization network 40 creates a crack propagation stopper area 41 within the encapsulation layer. The architecture of the microbattery thus limits the fragile areas of the microbattery, increases the integration density and has the effect of improving the performances of the microbattery.

Figure 14:
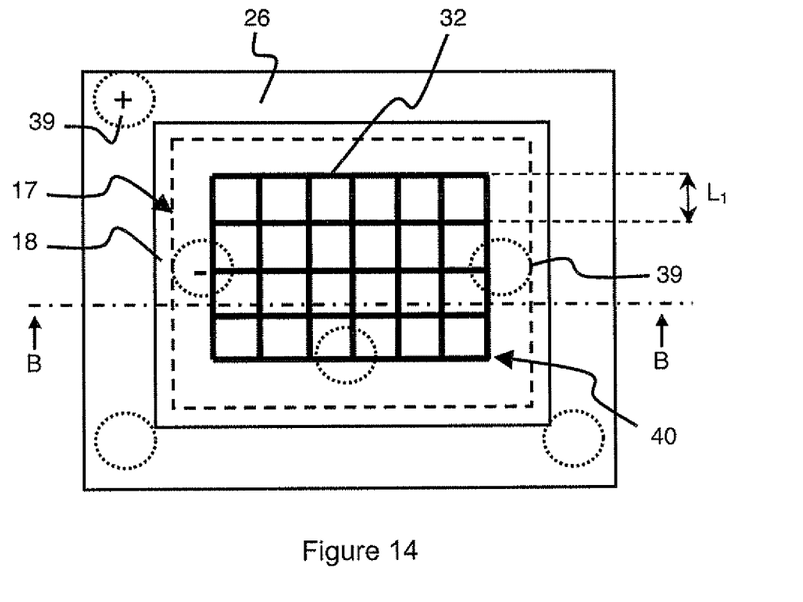
FIG. 14 schematically represents a microbattery according to a fourth particular embodiment of the invention, in top view.
Figure 15:
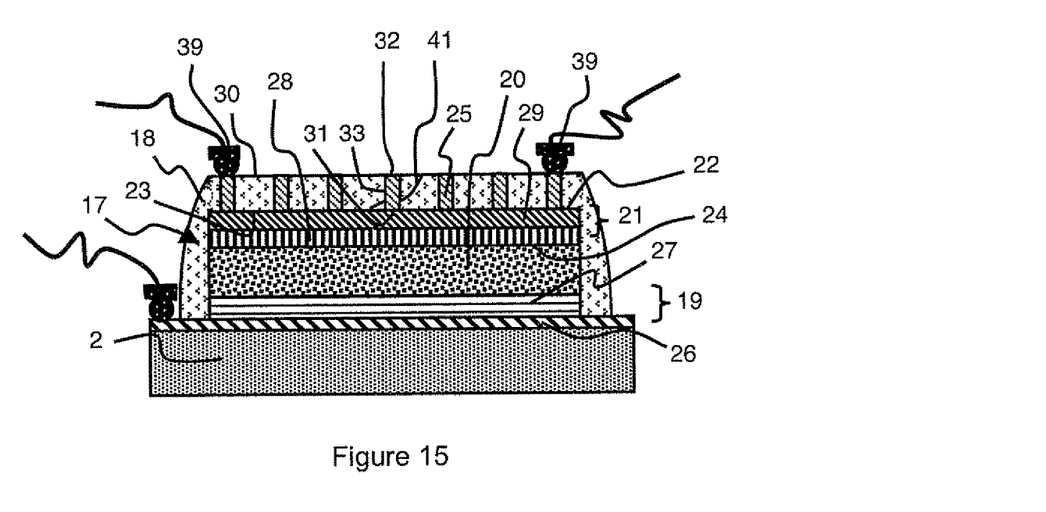
FIG. 15 schematically represents a microbattery according to the fourth particular embodiment of the invention, in cross-section along the line BB of FIG. 14.

According to a fourth particular embodiment represented in FIGS. 14 and 15, compartmentalization network 40 has a meshed structure with patterns in the form of a parallelogram, for example with a square or rectangular pattern.

As illustrated in FIG. 14, compartmentalization network 40 preferably has a structure in the form of a grid. The meshing of the barriers forms compartments isolated from one another in encapsulation layer 18 preventing any diffusion of species liable to impair the elements constituting stack 17 and cracks 41.

Upper walls 32 of the barriers further form connection lines at the surface of encapsulation layer 18 enabling electrical connection of the microbattery to one or more external electrical loads. As illustrated in FIG. 14, at least one contact pad 39 can for example be placed on a connection line in contact with one of upper walls 32 of compartmentalization network 40 and connected to the negative terminal of an external electrical load (not shown). At least one other contact pad 39 is then placed on the exposed surface of first current collector 26 and connected to the positive terminal of the external electrical load.

According to an alternative embodiment that is not represented, the exposed surface of first current collector 26 is situated on one side of encapsulated stack 17 only, in order to limit the surface of the substrate dedicated to the current collector and to improve the integration density.

The method for manufacturing a microbattery according to the third and fourth embodiments is identical to that of the first embodiment described in the foregoing with the exception of the form of the matrix enabling electrical connections 25 to be achieved. The method thus comprises the formation in first protective layer 34 of at least one trench 35 which forms the matrix to achieve the barriers. The barriers can conventionally be made from a single trench or from several trenches.

The invention is in no way limited to the embodiments described in the foregoing. In particular, encapsulation layer 18 is formed solely by first protective layer 34. The manufacturing method then differs from that of the first embodiment described in the foregoing in that the etching of the stack 17 is performed before that of first protective layer 34 and in that first protective layer 34 is deposited on first current collector 26 and stack 17 so that it completely covers stack 17. The trench or trenches are then made directly on encapsulation layer 18.

A lithium microbattery having an optimized architecture, with vertical connection, has been achieved according to the manufacturing method of the invention. The architecture of this battery avoids the presence of contact connection which fragilizes encapsulation layer 18 and impairs its mechanical and hermetic properties.

The microbattery according to the invention has an architecture that enables the surface of the substrate dedicated to the current collectors to be limited and the integration density to be improved. The presence of barriers, and in particular of a compartmentalization network, further enables the barrier effect of the encapsulation layer to be preserved limiting the fragile areas and the performances of the battery to be improved, in particular the lifetime, comparatively with microbatteries of the prior art.

These microbatteries find numerous industrial applications in particular in the field of microelectronics where miniaturization of components and autonomy requirements impose the use of smaller, more powerful storage batteries having longer lifetimes.

Unlike manufacturing methods according to the prior art which require several often complex steps of deposition and etching of the different layers forming the lithium microbattery, the manufacturing method according to the invention is easy to implement and simple. In characteristic manner, the manufacturing method can be performed with a reduced number of etching and masking steps, in particular a single step being necessary for the etching of stack 17. The functional interfaces of the microbattery being protected in the course of the manufacturing method, the quality of these interfaces is further preserved.

Such a manufacturing method of a lithium microbattery is compatible with technologies implemented in the microelectronics field, which in particular enables such a lithium microbattery to be incorporated on a microcomponent and results in manufacturing costs being able to be reduced.

The invention claimed is:

1. A microbattery that comprises a stack of solid thin layers formed on a substrate, said stack being covered by an encapsulation layer and successively comprising:
   a first current collector/electrode assembly in direct contact with the substrate,
   a solid electrolyte,
   a second current collector/electrode assembly having a front surface in direct contact with the inner surface of the encapsulation layer and a rear surface in direct contact with the solid electrolyte and, electrical connections of the second current collector/electrode assembly to an external electrical load, wherein the electrical connections are formed by at least two electrically conductive barriers passing through the encapsulation layer from the inner surface to the outer surface of said encapsulation layer, each of said barriers having a lower wall in direct contact with the front surface of the second current collector/electrode assembly and an upper wall opening onto the outer surface of the encapsulation layer and in that said barriers form a compartmentalization network within the encapsulation layer.

2. The microbattery according to claim 1, wherein at least two barriers are adjacent and parallel to one another and are separated by a part of the encapsulation layer.

3. The microbattery according to claim 2, wherein the distance separating the two adjacent and parallel barriers is smaller than or equal to the inverse of the square root of the dislocation density of said encapsulation layer.

4. The microbattery according to claim 1, wherein the compartmentalization network has a meshed structure with patterns in the form of a parallelogram, preferably in the form of a grid.

5. The microbattery according to claim 1, wherein the side walls of each barrier are perpendicular to the front surface of the second current collector/electrode assembly.

6. The microbattery according to claim 1, wherein the upper wall of the barrier forms a common flat surface with the outer surface of the encapsulation layer.

7. A manufacturing method of a microbattery according to claim 1, comprising the following successive steps:

full-wafer deposition, on the substrate of a stack of thin layers successively forming a first current collector/electrode assembly, a solid electrolyte, and a second current collector/electrode assembly, full-wafer deposition of a first protective layer on the second current collector/electrode assembly, making in the first protective layer at least one trench that forms a matrix to form the barriers, said trench passing through the thickness of the first protective layer and opening onto the front surface of the second current collector/electrode assembly and, filling the trench with an electrically conductive material.

8. The method according to claim 7, wherein the filling step comprises deposition of a thin layer of electrically conductive material on the first protective layer followed by selective etching of said thin layer.

9. The method according to claim 7, comprising one or more etching steps of the stack to localize the microbattery on the substrate, after filing of the trench.

10. The method according to claim 9, wherein, after etching of the stack, a second protective layer is made covering all the lateral parts of the stack and forming an encapsulation layer with the first protective layer.

* * * * *